United States Patent [19]

Potter et al.

[11] Patent Number: 4,581,433

[45] Date of Patent: Apr. 8, 1986

[54] ELASTOMER POLYURETHANE-POLYUREA COATINGS BASED ON BIS(4-ISOCYANATOCYCLOHEXYL)METHANE

[75] Inventors: Terry A. Potter, New Martinsville, W. Va.; Peter H. Markusch, McMurray; David J. Prepelka, Coraopolis, both of Pa.

[73] Assignee: Mobay Corporation, Pittsburgh, Pa.

[21] Appl. No.: 728,124

[22] Filed: Apr. 29, 1985

[51] Int. Cl.$^4$ ............................................. C08G 18/10
[52] U.S. Cl. .................... 528/64; 427/385.5; 528/62; 528/63
[58] Field of Search ...................... 528/64, 62, 63; 427/385.5

[56] References Cited

U.S. PATENT DOCUMENTS

| | | | |
|---|---|---|---|
| 3,428,610 | 2/1969 | Klebert | 260/75 |
| 3,600,358 | 8/1971 | Taub | 528/64 |
| 4,212,916 | 7/1980 | Tanaka et al. | 528/64 |
| 4,463,126 | 7/1984 | Gruber et al. | 524/589 |

*Primary Examiner*—Maurice J. Welsh
*Attorney, Agent, or Firm*—Gene Harsh; Joseph C. Gil

[57] ABSTRACT

The present invention relates to coating compositions comprising (i) an isocyanate prepolymer based on bis(4-isocyanatocyclohexyl)methane and polyalkylene ether polyols having hydroxyl functionalities of 2 to 3 and (ii) at least one diprimary aromatic diamine having at least one alkyl substituent in an ortho-position to one amino group and two alkyl substituents in both ortho-positions to the other amino group.

4 Claims, No Drawings

ELASTOMER POLYURETHANE-POLYUREA COATINGS BASED ON BIS(4-ISOCYANATOCYCLOHEXYL)METHANE

BACKGROUND OF THE INVENTION

Coatings prepared from (i) isocyanate prepolymers based on isophorone diisocyanate and polyalkylene ether polyols, and (ii) diprimary aromatic diamines having at least one alkyl substituent with 2 or 3 carbon atoms in an ortho-position to at least one of the amine groups, are known and discussed in U.S. Pat. No. 4,463,126. Although such coatings have excellent physical properties, for many purposes, the pot life (or gel time) of the composition is too short.

The preparation of polyurethane-polyureas using aromatic amines having alkyl groups in the ortho positions to the amine groups and a wide variety of isocyanate prepolymers is also well known. See, U.S. Pat. No. 3,428,610. Although this patent suggests a wide variety of isocyanates which can be used to prepare the prepolymers used therein (including dicyclohexylmethane-4,4'-diisocyanate; note column 3, line 71 through column 4, line 14, and particularly column 4, line 5), the reference only describes the use of hexamethylene diisocyanate (Examples 1–5 and 8–10) and toluene diisocyanate (Examples 6 and 7) in the working examples. Coatings based on hexamethylene diisocyanate prepolymers, while having good physical properties, tend to have pot lives too short for many purposes.

DESCRIPTION OF THE INVENTION

The present invention is directed to an elastomeric polyurethane-urea coating prepared by reacting:

(a) an isocyanate-terminated prepolymer having an isocyanate group content of from 1 to 20% by weight and prepared by reacting bis(4-isocyanatocyclohexyl)methane with one or more polyalkylene ether polyols having an average hydroxyl functionality of from 2 to 3, or, a mixture of said isocyanate-terminated prepolymer with at least one other di- or triisocyanate having aliphatically or cycloaliphatically bound isocyanate groups, said mixture having an isocyanate group content of from 1 to 20% by weight, and (b) a diprimary aromatic diamine which contains at least one alkyl substituent in the ortho-position to one amino group and two alkyl substituents in both ortho-positions of the other amino group, said components (a) and (b) being reacted in amounts such that the isocyanate to amine equivalent ratio is from 0.5:1 to 1.5:1.

The present invention also relates to a process for the production of elastic coatings by coating a substrate with a solvent-free or low solvent coating composition comprising:

(a) an isocyanate-terminated prepolymer having an isocyanate group content of from 1 to 20% by weight and prepared by reacting bis(4-isocyanatocyclohexyl)methane with one or more polyalkylene ether polyols having an average hydroxyl functionality of from 2 to 3, or, a mixture of said isocyanate-terminated prepolymer with at least one other di- or triisocyanate having aliphatically or cycloaliphatically bound isocyanate groups, said mixture having an isocyanate group content of from 1 to 20% by weight, and (b) a diprimary aromatic amine which contains at least one alkyl substituent in the ortho-position to one amino group and two alkyl substituents in both ortho-positions to the other amino group, in amounts such that the isocyanate to amine equivalent ratio is from 0.5:1 to 1.5:1.

The isocyanate component (a) has an isocyanate group content of from 1 to 20% by weight, preferably from 2 to 10% by weight. Isocyanate component (a) comprises either a prepolymer based on bis(4-isocyanatocyclohexyl)methane and a polyether polyol or polyether polyol mixture having an average OH functionality of from 2 to 3 and an average molecular weight, calculated from the functionality and the hydroxyl content, of from 500 to 4000, preferably from 1000 to 3000, or mixtures of said prepolymer with other organic di- or triisocyanates having aliphatically and/or cycloaliphatically bound isocyanate groups.

Preparation of the isocyanate prepolymer is carried out in a known manner by the reaction of bis(4-isocyanatocyclohexyl)methane (hereinafter referred to as HMDI) with subequivalent quantities of a polyether polyol or polyether polyol mixture having an average hydroxyl functionality of 2 to 3 and an average molecular weight, calculated from the hydroxyl functionality and hydroxyl content, of from 500 to 4000, preferably from 1000 to 3000. In preparing the prepolymers, the NCO/OH equivalent ratio is in the range of from 1.5:1 to 7:1, and preferably from 2:1 to 4:1. When using an HMDI excess above 2:1 in this reaction, mixtures of prepolymers with free HMDI are obtained. The isocyanate component used in the process according to the invention may also consist of mixtures of prepolymers of the type mentioned above with up to 500 isocyanate equivalents percent, and preferably up to 300 isocyanate equivalents percent, based on the isocyanate groups of the prepolymer, of other organic polyisocyanates having aliphatically and/or cycloaliphatically bound isocyanate groups such as, for example, isophorone diisocyanate, hexamethylene diisocyanate, tris-(isocyanatohexyl)-biuret and/or tris-(isocyanatohexyl)-isocyanurate, but this is less preferred than the use of pure prepolymers or their mixtures with excess HMDI. When such mixtures are used, they must have an isocyanate group content of from 1 to 20% by weight.

Suitable polyalkylene ether polyols for the preparation of the prepolymers include the known compounds used in polyurethane chemistry such as alkoxylation products, and in particular ethoxylation and/or propoxylation products of di- and/or trifunctional starter molecules such as water, ethylene glycol, 1,2-dihydroxypropane, trimethylolpropane or glycerol. Polyether polyol mixtures, obtained by the alkoxylation of starting mixtures having an average hydroxyl functionality of 2 to 3 and containing compounds with more than 3 hydroxyl groups (such as pentaerythritol) may also be used. Preferred polyether polyols include polypropylene glycol and/or propoxylated trimethylolpropane within the above average molecular weight range.

The amine component (b) which is essential to this invention is a diprimary aromatic diamine which contains at least one alkyl substituent in the ortho-position to one amino group and two alkyl substituents in both ortho-positions to the other amino group. It is presently preferred that at least one of the alkyl groups contain two or more carbon atoms. It is more preferred that at least two of the alkyl groups contain two or three carbon atoms. Typical examples of such aromatic diamines include 1,3-diethyl-2,4-diamino benzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3',5-tetraethyl-4,4'-diamino-diphenylmethane, 3,5,3',5'-tetraisopropyl-4,4'-diamino-diphenylmethane, 3,5-diethyl-3',5'-diisopropyl-4,4'-diamino-diphenylmethane and mixtures of such diamines. Preferred are 1-methyl-3,5-diethyl-2,4-diaminobenzene, 1-methyl-3,5-diethyl-2,6-diaminobenzene and 1,3,5-triethyl-2,6-diaminobenzene.

The coating composition may also contain up to 50 equivalent percent, based on all the isocyanate reactive groups present in the mixture of dihydric or trihydric, preferably dihydric alcohols having primary hydroxyl groups, e.g., ethylene glycol, diethylene glycol, triethylene glycol or other polyether polyols of the above-mentioned functionality containing primary hydroxyethyl end groups and having an average molecular weight of up to 6000. The use of hardener mixtures of this type is, however, much less preferred than the use of pure aromatic diamines or diamine mixtures.

Components (a) and (b) which are essential to this invention are used in such quantities that the equivalent ratio of isocyanate groups of component (a) to amino groups of component (b) is in the range of from 0.5:1 to 1.5:1, and is preferably from 0.9:1 to 1.1:1.

It is frequently advantageous if, in addition to the components (a) and (b), there are incorporated, in the coating compositions to be used according to the invention, from 0.1 to 5% by weight, preferably from 0.5 to 2% by weight, of organic, preferably cycloaliphatic carboxylic acid anhydrides, in particular dicarboxylic acid anhydrides such as hexahydrophthalic acid anhydride or methyl hexahydrophthalic acid anhydride, which results in a marked improvement in the rate of hardening without adversely affecting the pot life of the coating compounds.

The coating compositions to be used according to the invention may also contain the usual auxiliary agents and additives employed in coating technology.

Thus, the coating compounds may contain, for example, up to 15% by weight, based on the total weight of coating compounds, of conventional lacquer solvents such as toluene, xylene, butyl acetate and/or ethylene glycol monoethylether acetate although the use of solvent-free coating compounds is preferred according to the invention.

Other auxiliary agents and additives which may optionally be used include, e.g., pigments, fillers, plasticizers such as e.g., coal, tar and levelling agents. It is generally not necessary to add the usual catalysts which accelerate isocyanate addition reactions since the compositions to be used according to the invention have a sufficiently high reactivity in the absence of such catalysts.

The compositions having the composition described above and used according to the invention generally have a viscosity at 23° C. of from 1000 to 30,000 mPa.s and a pot life of approximately 10 to 120 minutes.

These products may be used for coating any substrate. One preferred field of application of the coating compounds to be used according to the invention is the coating of mineral building materials which are frequently moist, e.g., the coating of concrete constructions or of brick work. The special advantage of the process according to the invention lies in the fact that when coating such moist mineral substrates, highly elastic, homogeneous coatings, i.e., coatings free from blisters are obtained. The process according to the invention is suitable, in particular, for the production of thick coatings on such substrates, i.e., coatings having a dry film thickness of from 0.2 to 5 mm.

The invention is further illustrated, but is not intended to be limited by the following examples in which all parts and percentages are by weight unless otherwise specified.

EXAMPLES

In the examples, the following materials were used:

Isocyanates

HMDI: Bis(4-isocyanatocyclohexyl)methane
IPDI: Isophorone diisocyanate [1-isocyanato3,3,5-trimethyl-5-isocyanatomethylcyclohexane]
HDI: Hexamethylene diisocyanate

Polyethers

PPG 2025: Polypropylene glycol of molecular weight 2000.
PMEG 1000: Polytetramethylene glycol of molecular weight 1000.
PMEG 2000: Polytetramethylene glycol of molecular weight 2000.
M-3600: Polypropylene glycol of molecular weight 2000.
E-9109: Polypropylene glycol of molecular weight 1000.

Amines

DETDA: a 65/35 mixture of 1-methyl-3,5-diethyl-2,4-diaminobenzene and 1-methyl-3,5-diethyl-2,6-diaminobenzene.
TEMPDA: 1,3,5-triethyl-2,6-diaminobenzene.

Other Materials

T-12: Dibutyl tin dilaurate
Xylene
PM-Acetate: Propylene glycol, monomethyl ether acetate.
HHPA: Hexahydrophthalic anhydride.

PREPOLYMER PREPARATION

The materials used and the amounts thereof were as indicated in Table 1. The general procedure used was as follows: The materials were mixed in a one liter, 3-neck flask provided with a stirrer. The mixture was reacted at temperatures ranging from about 90° to about 110° C. The resultant prepolymers had the isocyanate group contents and viscosities noted in Table 1.

The one exception to the general procedure was Prepolymer P. This prepolymer was produced by reacting the components noted at 120° C. The mixture was held at that temperature with stirring for four hours. The product was then subjected to thin film evaporation as described in U.S. Pat. No. 3,183,112, column 5, lines 37–40 (see also FIG. 3), to yield a prepolymer having the properties noted in Table 1.

TABLE I

| Prepolymer | HMDI | IPDI | HDI | PPG 2025 | PMEG 1000 | PMEG 2000 | M-3600 | E-9109 | T-12 | Viscosity mPa·s at 25° C. | NCO % by wt. |
|---|---|---|---|---|---|---|---|---|---|---|---|
| A | 99.6 | — | — | 400 | — | — | — | — | 2 drops | 20,200 | 3.02 |

TABLE I-continued

| Prepolymer | HMDI | IPDI | HDI | PPG 2025 | PMEG 1000 | PMEG 2000 | M-3600 | E-9109 | T-12 | Viscosity mPa·s at 25° C. | NCO % by wt. |
|---|---|---|---|---|---|---|---|---|---|---|---|
| B | — | 84.4 | — | 400 | — | — | — | — | 1 drop | 7,440 | 3.01 |
| C | 327.5 | — | — | — | 500 | — | — | — | — | 21,600 | 7.47 |
| D | — | 277.5 | — | — | 500 | — | — | — | — | 11,900 | 7.88 |
| E | 394 | — | — | — | 500 | — | — | — | — | 10,800 | 9.25 |
| F | — | 333 | — | — | 500 | — | — | — | — | 7,310 | 9.77 |
| G | 131 | — | — | — | — | 500 | — | — | — | — | 3.19 |
| H | — | 111 | — | — | — | 500 | — | — | — | 48,000 | 3.30 |
| I | 197 | — | — | — | — | 500 | — | — | — | — | 5.96 |
| J | — | 166 | — | — | — | 500 | — | — | — | 15,800 | 6.15 |
| K | 203.3 | — | — | — | — | — | 596.7 | — | — | 5,560 | 4.93 |
| L | — | 175.2 | — | — | — | — | 624.8 | — | — | 3,950 | 4.77 |
| M | — | 156.2 | — | — | — | — | 624 | — | 1 drop | 7,020 | 3.88 |
| N | 168 | — | — | — | — | — | 556 | — | 1 drop | 18,800 | 4.33 |
| O | 168 | — | — | — | — | — | 556 | — | 5 drops | 17,660 | 4.01 |
| P | — | — | 480 | — | — | — | — | 400 | — | 1,720 | 6.38 |
| Q | 297.5 | — | — | — | — | — | — | 502.5 | — | 34,080 | 6.32 |

EXAMPLES 1 THROUGH 5

Various mixtures of prepolymers and amines and, in some cases, solvent were prepared and tested according to ASTM-D-2471 (dry stick gel time). The prepolymers, amines and solvents were used as indicated in Table II. The gel times were as reported in Table II. Examples 2, 4, 7, 8, 10, 12 and 13 represent comparative examples.

TABLE II

| Example # | Prepolymer Type | Prepolymer Amount | Amine Type | Amine Amount | PM-Acetate, Amount | Gel Time, Minutes |
|---|---|---|---|---|---|---|
| 1 | E | 95.3 | DETDA | 17.8 | — | 13 |
| 2 | F | 90.3 | DETDA | 17.8 | — | 6 |
| 3 | C | 117 | DETDA | 17.8 | — | 24 |
| 4 | D | 111 | DETDA | 17.8 | — | 14 |
| 5 | K | 89.5 | DETDA | 8.9 | — | 44 |
| 6 | K | 89.5 | TEMPDA | 9.6 | — | 62 |
| 7 | L | 92.5 | DETDA | 8.9 | — | 27 |
| 8 | L | 92.5 | TEMPDA | 9.6 | — | 42 |
| 9 | O | 100 | DETDA | 6.8 | — | 104 (108) |
| 10 | M | 100 | DETDA | 6.8 | — | 82 (77) |
| 11 | N | 100 | DETDA | 6.8 | — | 96 (94) |
| 12 | P | 62.5 | DETDA | 7.8 | — | 7 |
| 13 | P | 62.5 | DETDA | 7.8 | 10 | 15 |
| 14 | Q | 62.5 | DETDA | 7.8 | — | 36 |
| 15 | Q | 62.5 | DETDA | 7.8 | 10 | 53 |

The parenthetical numbers under the gel time columns for Examples 9 through 11 represent results when the examples were repeated. In the case of Examples 13 and 15, films were cast and physical properties according to ASTM-D-2370 were taken after two days. The results were as follows:

| Example | 13 | 15 |
|---|---|---|
| Elongation % | 620 | 410 |
| Tensile strength, psi | 6250 | 5660 |
| 100% modulus, psi | 950 | 1570 |
| 300% modulus, psi | 1014 | 3660 |
| yield str, psi | 970 | 1300 |

EXAMPLES 16 THROUGH 35

Various coatings were prepared from prepolymers, amines and solvents. The solvent was mixed first with the prepolymer. The amine was then added to prepolymer/solvent mixtures and the resultant composition was cast on a glass plate using a draw down bar to a film thickness of 10 mils. Following reaction, the films were tested for film properties according to ASTM-D-2370. The materials used and the amounts thereof, together with the physical properties of the resultant films were as indicated in Table III. Examples 16, 19, 21, 23, 25, 28–31 and 34 represent comparative examples.

TABLE III

| Example | Prepolymer Type | Prepolymer Amount | Amine Type | Amine Amount | Solvent Type | Solvent Amount | 100% Modulus psi | 200% Mod. psi | 300% Mod. psi | Yield psi | Ultimate psi | % Elongation |
|---|---|---|---|---|---|---|---|---|---|---|---|---|
| 16 | B | 266 | DETDA | 14 | Xylene | 15 | — | 320 | — | — | — | 1000 |
| 17 | A | 266 | " | 14 | " | 20 | — | 530 | — | — | — | " |
| 18 | C | 69.5 | " | 10.5 | PM Acetate | 20 | 2606 | 4152 | — | 2212 | 5758 | 290 |
| 19 | D | 69.0 | " | 11 | " | 20 | 1733 | 2587 | 4427 | 1600 | 5387 | 360 |
| 20 | E | 67.4 | " | 12.6 | " | 20 | 3364 | 4636 | — | 3159 | 4272 | 200 |
| 21 | F | 66.8 | " | 13.2 | " | 20 | 2477 | 4027 | — | 2206 | 4200 | 260 |
| 22 | G | 75.2 | " | 4.8 | " | 20 | 700 | 1000 | 1367 | — | 8833 | 630 |
| 23 | H | 75 | " | 5 | " | 20 | 657 | 879 | 1197 | — | 8294 | 600 |
| 24 | I | 71.4 | " | 8.6 | " | 20 | 1421 | 1876 | 2178 | — | 5915 | 470 |
| 25 | J | 71.2 | " | 8.8 | " | 20 | 1100 | 1433 | 2133 | — | 6033 | 500 |
| 26 | K | 45 | " | 4.5 | " | 10 | 733 | 925 | 1088 | — | 1376 | 500 |
| 27 | K | 45 | TEMPDA | 4.8 | " | 10 | 712 | 860 | 1008 | — | 1080 | 450 |
| 28 | L | 46.5 | DETDA | 4.5 | " | 10 | 485 | 645 | 741 | — | 829 | 430 |
| 29 | L | 46.5 | TEMPDA | 4.8 | " | 10 | 504 | 651 | 744 | — | 779 | 390 |
| 30 | M | 100 | DETDA | 6.8 | " | 20 | 427 | 621 | 808 | — | 4773 | 970 |
| 31 | M | 100 | TEMPDA | 7.3 | " | 20 | 464 | 648 | 851 | — | 5573 | 930 |
| 32 | N | 100 | DETDA | 6.8 | " | 20 | 499 | 685 | 845 | — | 1640 | 700 |
| 33 | N | 100 | TEMPDA | 7.3 | " | 20 | 539 | 746 | 923 | — | 2503 | 920 |
| 34 | M | 50 | DETDA | 3.4 | " | 9 | 500 | 690 | 890 | — | 4350 | 1000 |

TABLE III-continued

| Ex-ample | Prepolymer Type | Prepolymer Amount | Amine Type | Amine Amount | Solvent Type | Solvent Amount | 100% Modulus psi | 200% Mod. psi | 300% Mod. psi | Yield psi | Ultimate psi | % Elongation |
|---|---|---|---|---|---|---|---|---|---|---|---|---|
| 35 | O | 50 | " | 3.5 | " | 9 | 580 | 800 | 1000 | | 3550 | 860 |

EXAMPLES 36 THROUGH 43

Four prepolymers were prepared. The materials used and the amounts thereof were as follows:

(a) PREPOLYMER R: 500 parts of PMEG 1000 and 327.5 parts of HMDI.
(b) PREPOLYMER S: 500 parts of PMEG 1000 and 277.5 parts of IPDI.
(c) PREPOLYMER T: 500 parts of PMEG 1000, 282 parts of HMDI and 38.9 parts of IPDI.
(d) PREPOLYMER U: 500 parts of PMEG 1000, 295.2 parts of HMDI and 27.8 parts of IPDI.

The materials were mixed in a one liter, 3-neck flask provided with a stirrer. The mixture was reacted at temperatures ranging from about 90° to about 110° C. The resultant prepolymers has the isocyanate group contents and viscosities noted as follows:

(a) PREPOLYMER R: % NCO=7.27; viscosity mPa.s at 25° C.=20,280.
(b) PREPOLYMER S: % NCO=7.70; viscosity mPa.s at 25° C.=12,560.
(c) PREPOLYMER T: % NCO=7.37; viscosity mPa.s at 25° C.=19,440.
(d) PREPOLYMER U: % NCO=7.22; viscosity mPa.s at 25° C.=19.660.

Various mixtures of prepolymers, DETDA, PM-acetate and in some cases HHPA were prepared and tested according to ASTM-D-2471 (dry stick gel time). The materials and amounts used, and the gel times were as reported in TABLE IV. Examples 37 and 41 are comparative examples.

TABLE IV

| Example # | Prepolymer Type | Prepolymer Amount | DETDA Amount | PM-Acetate Amount | HHPA Amount | Gel Time Minutes |
|---|---|---|---|---|---|---|
| 36 | R | 60.7 | 8.9 | 10.0 | — | 42 |
| 37 | S | 57.3 | 8.9 | 10.0 | — | 14 |
| 38 | T | 59.9 | 8.9 | 10.0 | — | 35 |
| 39 | U | 59.9 | 8.9 | 10.0 | — | 30 |
| 40 | R | 60.7 | 8.9 | 10.0 | 0.3 | 20 |
| 41 | S | 57.3 | 8.9 | 10.0 | 0.3 | 10 |
| 42 | T | 59.9 | 8.9 | 10.0 | 0.3 | 18 |
| 43 | U | 59.9 | 8.9 | 10.0 | 0.3 | 18 |

EXAMPLES 44 THROUGH 47

Various coatings were prepared from prepolymers, DETDA, and PM-acetate. The solvent was mixed first with the prepolymer. The DETDA was then added to the prepolymer/solvent mixture and the resultant composition was cast on a glass plate using a draw down bar. The cast composition was air dried at room temperature for one week. The films were then tested according to ASTM-D-2370. The materials and amounts used, as well as the physical properties of the films were as indicated in TABLE V. Example 45 is a comparative example.

TABLE V

| Example | Prepolymer Type | Prepolymer Amount | DETDA Amount | PM-Acetate Amount | Tensile, Modulus, Psi 100% | 200% | 300% | Ultimate psi | Yield psi | % Elongation |
|---|---|---|---|---|---|---|---|---|---|---|
| 44 | R | 60.7 | 8.9 | 10.0 | 2340 | 3527 | Failed | 4810 | 2117 | 273 |
| 45 | S | 57.3 | 8.9 | 10.0 | 2007 | 2967 | 4733 | 6733 | 1833 | 387 |
| 46 | T | 59.9 | 8.9 | 10.0 | 2907 | 4267 | 6250 | 6550 | 2650 | 323 |
| 47 | U | 59.9 | 8.9 | 10.0 | 2583 | 3867 | 5817 | 6167 | 2433 | 317 |

EXAMPLE 48

A mixture of 60.7 parts of PREPOLYMER R, 7.1 parts of DETDA, 0.6 parts of ethylene glycol and 10 parts of PM-Acetate was tested according to ASTM-D-2471 and were found to have a gel time of 39 minutes. When a film of the composition was tested according to ASTM-D-2370, it was found to have the following properties:

| Yield modulus | 1373 psi |
|---|---|
| 100% modulus | 1583 psi |
| Tensile str. at break | 1807 psi |
| % Elongation | 150% |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An elastomeric polyurethane-urea coating prepared by reacting
   (a) an isocyanate-terminated prepolymer having an isocyanate group content of from 1 to 20% by weight and prepared by reacting bis(4-isocyanatocyclohexyl)methane with one or more polyalkylene ether polyols having an average hydroxyl functionality of from 2 to 3, or, a mixture of said isocyanate-terminated prepolymer with at least one other di- or triisocyanate having aliphatically or cycloaliphatically bound isocyanate groups, said mixture having an isocyanate group content of from 1 to 20% by weight, and
   (b) a diprimary aromatic diamine which contains at least one alkyl substituent in the ortho-position to one amine group and two alkyl substituents in both ortho-positions to the other amine group, the amounts of (a) and (b) being such that the isocyanate to amine equivalent ratio is from 0.5:1 to 1.5:1.

2. The coating of claim 1 wherein component (a) has an isocyanate group content of from 2 to 10% by weight.

3. The coating of claim 1 wherein said ratio is from 0.9:1 to 1.1:1.

4. A process for the production of elastic coatings comprising coating a substrate with a composition and allowing the composition to gel, wherein said composition comprises
   (a) an isocyanate-terminated prepolymer having an isocyanate group content of from 11 to 20% by weight and prepared by reacting bis(4-isocyanatocyclohexyl)methane with one or more polyalkylene ether polyols having an average hydroxyl functionality of from 2 to 3, or, a mixture of said isocyanate-terminated prepolymer with at least one other di- or triisocyanate having aliphatically or cycloaliphatically bound isocyanate groups, said mixture having an isocyanate group content of from 1 to 20% by weight, and
   (b) a diprimary aromatic diamine which contains at least one alkyl substituent in the ortho-position to one amine group and two alkyl substituents in both ortho-positions to the other amine group, the amounts of (a) and (b) being such that the isocyanate to amine equivalent ratio is from 0.5:1 to 1.5:1.

* * * * *